Dec. 19, 1939.   L. GOLDHAMMER   2,183,768
CAMERA WITH EXPOSURE METER
Filed May 7, 1936
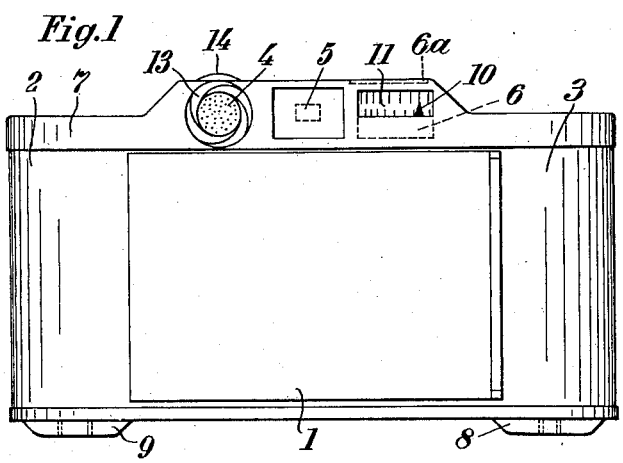
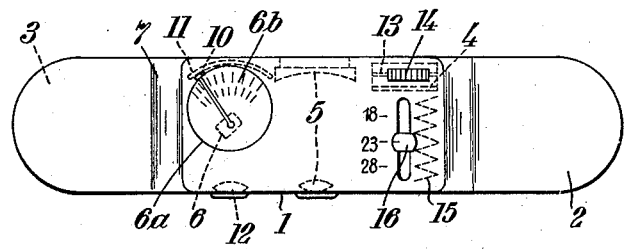
Inventor
Leo Goldhammer.
By Attorney
Philip S. Hopkins.

Patented Dec. 19, 1939

2,183,768

UNITED STATES PATENT OFFICE 2,183,768

CAMERA WITH EXPOSURE METER

Leo Goldhammer, Munich, Germany, assignor, by mesne assignments, to Agfa Ansco Corporation, Binghamton, N. Y., a corporation of Delaware Application May 7, 1936, Serial No. 78,414
In Germany May 8, 1935

2 Claims. (Cl. 88—23)

My present invention relates to a roll film camera provided with an exposure meter.

One of its objects is a roll film camera in which an exposure meter has been built in so that an improved construction results. Further objects will be seen from the detailed specification following hereafter.

It has already been proposed to build photoelectric cells that is to say cells of the cuprous oxide type and the corresponding measuring instruments into roll film cameras.

According to the invention the casing of the camera is provided with a chamber into which are built all or part of the parts of a photoelectric exposure meter, for instance, a photo-electric cell of the cuprous oxide type and a galvanometer. The photo-electric cell and the measuring instrument are suitably enclosed in a separate casing. It is advantageous to arrange the photo-electric cell, the galvanometer, a direct-vision finder or range-meter between the spool chambers of the roll film camera so that they may protrude over the casing or not, and to cover these parts by a ledge or a cap. The cell is arranged vertically and the galvanometer horizontally. By means of a transparent scale and of a hand bent at a right angle the instrument may be read in plan view or in elevation.

Details of the construction may be taken from the following description:

In the accompanying drawing, there is shown one embodiment of the invention:

Fig. 1 is a front view of a roll film camera with a built-in photo-electric exposure meter.

Fig. 2 is a plan view of the top narrow side of the camera.

In the casing of the roll film camera 1 a space is provided between the spool chambers 2 and 3 for housing the blocking-layer cell 4, the finder 5 and the measuring instrument 6. The parts 4, 5 and 6 are suitably calibrated before mounting them in the camera, assembled and housed in own casings. The cap 7 which is provided with a window 6a covers the parts so that the outer form of the camera has no or only a slight bulge.

At the lower side of the spool chambers are two tripod screw nuts 8 and 9 with different screw threads. The nuts are of the same length so that the camera can be set up edgewise upon these nuts.

In order to be able to read the galvanometer 6 in plan and elevational view, the end of the hand 10 is bent at a right angle. Behind the hand—when looked at in direction of view—there is provided a transparent, suitably bent scale 11. The deflection of the hand can be observed on the scale 11 through the magnifying lens 12 without one being forced to remove the camera from the eye. The scale 6b may be read through the window 6a of the cap 7. The opening of the cell 4 may be adjusted by an iris-diaphragm 13 which is operated by a milled ring 14. By means of this diaphragm 13 the opening of the camera-objective can easily be made to agree with the opening of the cell. A resistance 15 can be provided in the circuit of the cell so as to be able to take into account a filter, the sensitiveness of the film etc. According to the sensitiveness of the used material more or less resistance is cut in by a slide 16. When inserting a yellow filter before the objective, it is also possible to bring simultaneously a corresponding filter before the cell.

What I claim is:

1. In a roll film camera in combination a casing having a narrow side wall, a cap on said wall, two spool chambers in said casing, a photo-electric exposure-meter comprising a photo-electric cell, a measuring instrument, and a variable resistance, said measuring instrument comprising a directly readable scale in substantially parallel relationship with said wall, a second scale forming an angle with the first named scale, a pointer cooperating with said first scale and movable in response to the current of said cell, said pointer having its free end bent to make said end cooperate with said second scale, and optical means for observing said free end of said pointer and said second scale.

2. In a roll film camera in combination a casing having a narrow side wall, a cap on said wall, two spool chambers in said casing, a photo-electric exposure-meter comprising a photo-electric cell, a variable diaphragm in front of said cell, a measuring instrument and a variable resistance, said measuring instrument comprising a directly readable scale in substantially parallel relationship with said wall, a second scale forming an angle with the first named scale, a pointer cooperating with said first scale and movable in response to the current of said cell, said pointer having its free end bent to make said end cooperate with said second scale, and optical means for observing said free end of said pointer and said second scale.

LEO GOLDHAMMER.